United States Patent [11] 3,617,463

[72] Inventors Lawrence V. Gregor
Hopewell Junction;
Leon I. Maissel, Poughkeepsie; Charles L. Standley, Wappingers Falls, all of N.Y.

[21] Appl. No. 834,444
[22] Filed June 18, 1969
[45] Patented Nov. 2, 1971
[73] Assignee International Business Machines Corporation
Armonk, N.Y.

[54] APPARATUS AND METHOD FOR SPUTTER ETCHING
7 Claims, 5 Drawing Figs.

[52] U.S. Cl. .......... 204/298
[51] Int. Cl. .......... C23c 15/00
[50] Field of Search .......... 204/192, 298

[56] References Cited
UNITED STATES PATENTS
3,514,391 5/1970 Hablanian et al. .......... 204/298

*Primary Examiner*—John H. Mack
*Assistant Examiner*—Sidney S. Kanter
*Attorneys*—Hanifin and Jancin and Wolmar J. Stoffel

ABSTRACT: The object to be sputter etched is excited in a reduced atmosphere of inert gas by the application of an RF potential across a pair of electrodes, one of which supports the object and is capacitively coupled to the RF source. The improvement is a means to catch and retain material removed by the sputtering operation.

INVENTORS
LAWRENCE V. GREGOR
LEON I. MAISSEL
CHARLES L. STANDLEY

BY Wolmar J. Stoffel
ATTORNEY

APPARATUS AND METHOD FOR SPUTTER ETCHING

FIELD OF THE INVENTION

The field of the invention is in the shaping, etching, and cleaning of elements, coatings, and films by erosion induced by an electrical potential applied across at least two electrodes contained in an environment of low pressure.

DESCRIPTION OF THE PRIOR ART

Various techniques are known and have been used for the etching, shaping, and cleaning of objects, coatings, etc. The most common methods are physically abrading and chemical etching. However, these techniques have inherent limitations, particularly when used in modern electronic manufacturing applications, particularly in the manufacture of microminiaturized semiconductor components. The limitations of physically abrading are obvious when the object to be worked on is very small and the detail very intricate. Further, in many applications, particularly the manufacture of semiconductor devices, chemical etching has not proved completely satisfactory. For example, it is impossible with chemical etching to produce a groove in a material that has parallel walls. Further, chemical etchants may have adverse effects on associated elements, surfaces and coatings. In producing masks, semiconductor metallurgy, and related operations, undercutting of the etched material is a very serious shortcoming. Sputter etching has been utilized in such applications with great success. It is particularly attractive for materials which are difficult to etch by chemical means, as for example, silicon nitride. In sputter etching, material is removed from the object by the bombardment of the object with high-energy ions that are normally directed through a mask defining the pattern to be etched in the object. Sputter etching involves placing the object to be etched covered by an insitu mask in a reduced atmosphere in an inert gas such as argon and maintaining the object including the mask at a negative DC potential that will ionize the gas atoms and set up an ion sheath (Crooke's dark space) around the object. This ion sheath contains high-energy positive ions that bombard the material to perform the sputter etching. The difficulty with DC sputter etching is that an electrical charge tends to build up about the object to be etched after the ions have bombarded the object and have expended their energy. RF sputter etching alleviates this problem. Sputter etching is described and claimed in commonly assigned patent application, Ser. No. 540,054 and the principle of operation explained.

The technique of deposition of material by RF sputtering has been known for quite some time. It has been established more recently that during deposition of material by RF sputtering some remission of the material being deposited always occurs. The reemitted material will eventually land on some part of the apparatus or the target. There is a probability that a portion of this material will again be reemitted and find its way to be sputtered deposit. In RF sputter etching wherein the work or substrate is in essence the target, the same conditions exist. The material that is removed from the object being etched deposits on various surfaces of the vacuum chamber, and some fraction of this material will be reemitted and find its way back to the object.

Such redeposition of material during RF sputter etching is unacceptable for several reasons. If the surface that is being etched is made up of more than one material, for example, materials *a* and *b* exposed at surfaces A and B, respectively, then during the sputter etching process material *a* will be redeposited on surface B and material *b* will be redeposited on surface A thus upsetting the relative removal rates of these two materials, making the process uncontrollable. Further, even if the material or surface being etched is of uniform composition it may contain contaminants, and it is the objective of the sputtering process to remove same. Their continuous return then to the surface being etched may be highly undesirable. As for example, consider the sputter etching of oxide surfaces of a semiconductor device. It is well known that either all, or only the outermost layers, of such an oxide may be contaminated by sodium ions which will subsequently introduce instabilities into a semiconductor device protected in this fashion. The removal of the oxide along with the sodium ions during the sputter etching process is desirable. HOwever, in presently designed sputter etching apparatus a fraction of the sodium ions will always be returned to the oxide surface that is being etched so that it will not be possible entirely to remove this source of contamination. In certain operations, as for example in the fabrication of the insulating layer over the channel in a field-effect transistor, even very small amounts of contamination are unacceptable.

SUMMARY OF THE INVENTION

An object of this invention is to provide in a sputter etching apparatus a means to intercept and retain material removed from the object being eroded. Another object of this invention is to reduce contamination problems in sputter etching.

Still another object of this invention is to provide a method of reducing contamination of an object being sputter etched.

Still another object of this invention is to provide an improved apparatus which will minimize reemission during sputter etching operations.

The invention is a catcher element to trap particles eroded by the sputter etching. The element, which could be properly termed a "catcher," is positioned within the sputtering chamber in close proximity to the electrode supporting the object being sputter etched. The element can, if desired, serve as an electrode within the chamber. In general, the catcher element has a plurality of surface elements which are inclined or transverse to the general plane of the object support electrode. These surfaces are adapted to either hold or deflect sputtered particles onto associated surfaces until they adhere permanently.

BRIEF DESCRIPTION OF THE DRAWINGS

Still other and further objects, features, and advantages of the invention will become apparent from the following more particular description of preferred embodiments of the invention illustrated in the accompanying drawings.

DESCRIPTION OF PREFERRED EMBODIMENTS

Radiofrequency sputtering systems, both for the deposition of films, and for the etching of objects, take advantage of the characteristic difference in electron and ion mobility. The RF applied is greater than the plasma ion resonance frequency in the glow space, and lower than the plasma electron resonance frequency. Ion sheaths, commonly referred to as dark spaces, form next to the electrodes. To a first approximation, the glow space is at uniform potential and the potential differences between the electrodes are taken across the dark spaces. Further, the glow space of the discharge is capacitively coupled through the dark spaces to the electrodes and it is always more positive in potential than either electrode surface. Thus, in sputter depositing, during the portion of the cycle that the target electrode is biased negatively, positive ions are drawn across the dark space adjacent the target to bombard the target. The ions cause ejection of atoms of the target which deposit on surrounding surfaces, particularly the element being coated, which is supported near the target. In sputter etching during the portion of the cycle that the electrode supporting the object to be etched is biased negatively, positive ions are drawn across the dark space adjacent the electrode to bombard and erode the object. In the second part of the cycle electrons are attracted toward the respective target, or object being etched, to neutralize any build up of charge. During this latter portion of the cycle there occurs a like phenomena between the glow space and the opposite electrode which is conducive to bombardment with positive ions. By varying the physical arrangement of the RF source and electrodes, the spacing and dimensions of the electrodes, the desired phenomena, i.e., deposition or etching, can be caused to take place and can be optimized. In general, however, there is some resputtering in any sputtering operation, which in the case of sputter etching a portion of the material previously eroded deposited on various walls of the sputtering chamber is returned to the substrate. This introduces contamination which is undesirable.

Figure 1:
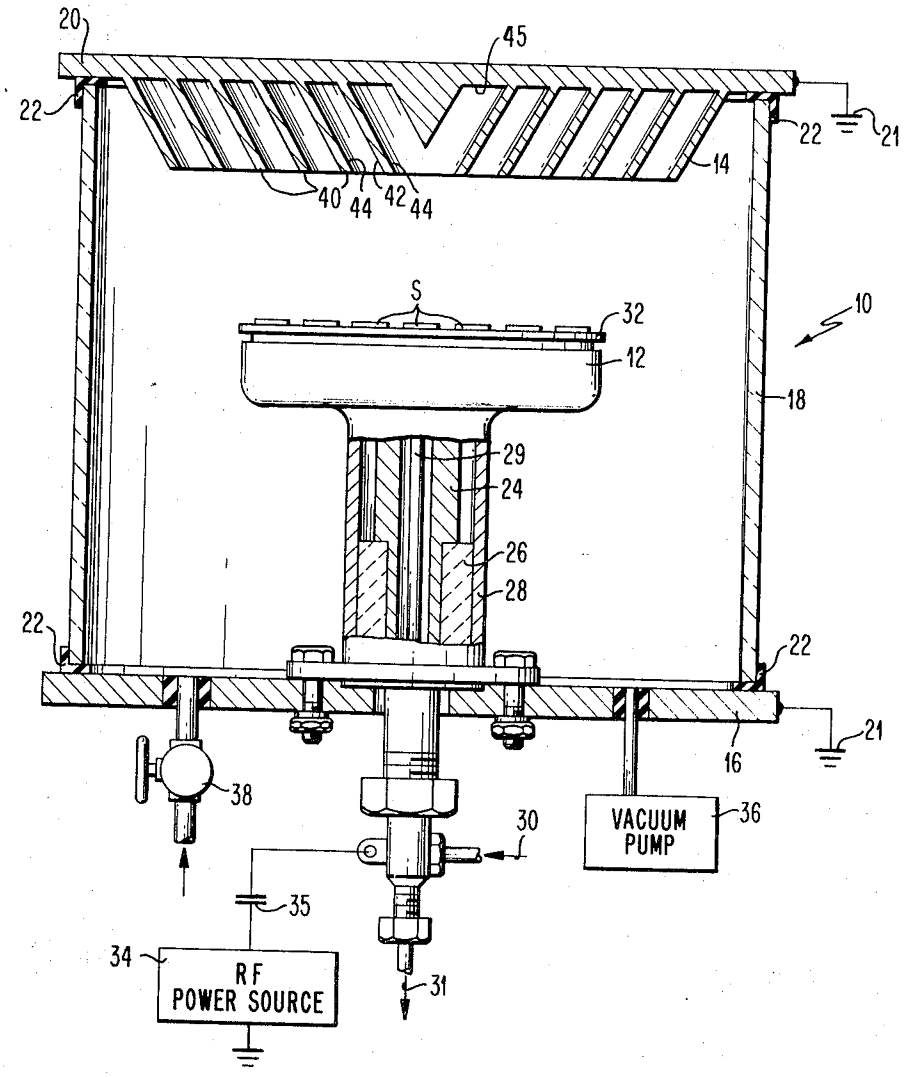
FIG. 1 is an elevational view in cross section showing a preferred specific embodiment of the catcher element of the invention and its association with elements of a sputter etching apparatus.

Reference may now be made to the accompanying drawings, FIGS. 1 through 5, which show preferred specific embodiments of the invention. Referring now to FIG. 1 there is illustrated somewhat schematically the entire combination of a sputtering apparatus 10 including a chamber having contained therein a substrate support electrode 12 and a catcher element 14. The chamber consists of a bottom plate 16 of conductive material, a cylindrical wall 18 supported on plate 16, made of either glass or metal, and the top plate 20 which can be either integral with the catcher element 14 or made in separate units. Plate 20 is supported on wall 18 and is preferably made of a conductive material. Seals 22 insure a vacuum-type joint between plate 16 and wall 18, and wall 18 and plate 20. Either plate 20, or plate 16, or both, are provided with a suitable ground 21. Electrode 12 is conventional and does not form part of the improvement of the invention. Electrode 12 consists of an electrode element 24 of a suitable conductive material, an annular-insulating element 26 of a suitable dielectric material which supports electrode element 24 and insulates it from the base plate 16, and shield 28. If desired, the element 24 can be provided with a suitable fluid cooling means which includes a concentrically disposed tube 29 in the hollow stem which either introduces or withdraws a coolant fluid from the hollow portion of element 24 underlying the top surface. As indicated by arrows 30 and 31 coolant fluid can be circulated to provide cooling. Substrates S rest on a glass or other dielectric plate 32 in turn supported on the top surface of electrode 24. RF power source 34 is connected to electrode element 24 through a capacitor 35. Capacitor 35 blocks the flow of DC current but does not impede alternating current of the frequency produced by the source 34. Plate 16 and any other conductive surface at ground potential serves as the second electrode in the chamber. Chamber 10 is evacuated by vacuum pump 36. Inert gas such as argon, can be introduced into chamber 10 through inlet 38.

Figure 4:
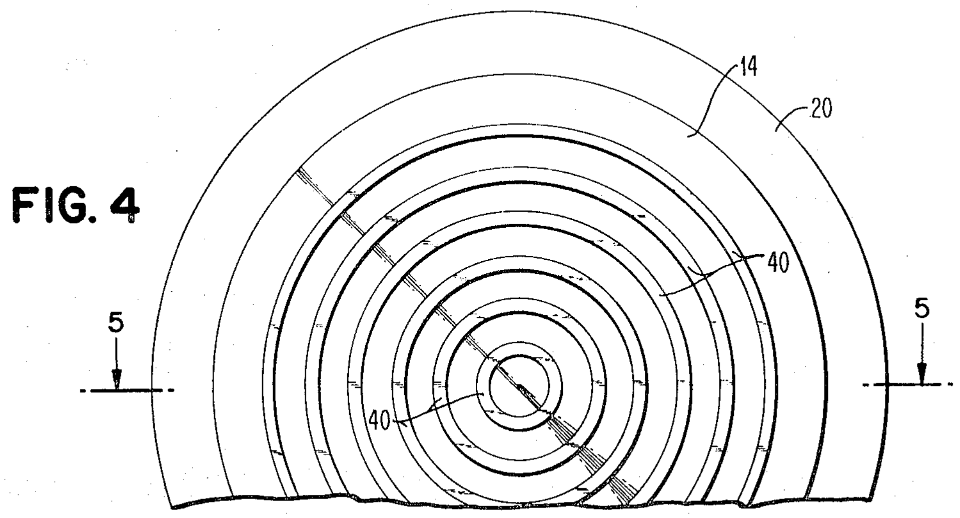
FIG. 4 is a bottom view in broken section of another preferred specific embodiment of the catcher of the invention.
Figure 5:
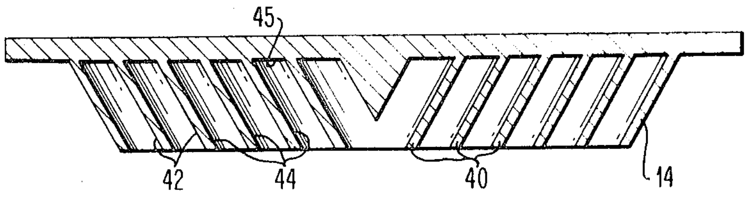
FIG. 5 is a cross-sectional view taken on line 5—5 of Fig. 4.

Catcher element 14 is disposed above substrate holder electrode 12 as shown in FIG. 1. Catcher element 14 in the embodiment shown has a baffle means, consisting of a plurality of concentric frustoconical fins, supported on plate 20. The fins can be of any suitable material typically metal such as aluminum. Fins 40 can be formed on plate 20 by any suitable method such as machining, casting, forming separately and attaching by welding, etc. Basically the same embodiment of the catching assembly is shown in FIGS. 4 and 5 of the drawing. Although the catcher element 14 is shown supported on the top of wall 18 it could be supported in any other simple matter, as for example, by upstanding rods supported on lower plate 16.

During the etching process the electrode 12 and its associated elements are all bombarded by positive ions. In the process the positive ions erode the unmasked and exposed portions of substrate S. However, the mask normally provided on the substrates, along with the glass plate 32, are bombarded. When this material is removed or eroded it comes off at random directions from the electrode 12 and may ultimately deposit on various surfaces of the sputtering apparatus including wall 18 and catcher element 14. However, the catcher element 14 is adapted to capture and retain the major portion of this sputtered material since it is disposed opposite the electrode 12. As previously mentioned, in any sputtering operation there is some reemission of the material of the wall and particularly the material deposited on the walls of the sputtering chamber. It is undesirable that this material, as for example, the photoresist and the material of the glass plate 32 be redeposited on the surface being etched. The catcher element 14 is arranged so that particles, both charged and neutral, will strike the surfaces of fins 40. After landing on the surfaces the material will either stick or be reemitted. Since the ionic bombardment which is responsible for the reemission of material is in an upward direction, such reemitted material will move towards the rear or underside of the adjoining fin. There it may be either stick or again be reemitted. If it is reemitted again the probability is that it will land on another fin. With this arrangement of fins, the probability is very high that particles will remain inside the catcher. In general the arrangement is such that the material will always penetrate further and further into the catcher thus decreasing the probability that it will emerge therefrom. An analogous situation is tossing a ball into a room having a small single window. The ball upon entering the room will bounce randomly off the walls of the room and ultimately come to rest. Although there is a finite probability that the ball will bounce back out through the same window from whence it came, this probability is relatively small if the window is small. A further function of the catcher is preventing the return of material deposited on the catcher, and also the materials of the catcher from being dislodged by particles and returning to the substrate-holder electrode. The catcher 14 as well as other surfaces in the sputtering chamber are subjected to bombardment by both neutral and charged particles. This bombardment can cause reemission of the material from the surface of the catcher or walls. However, it can be seen that the probability of material emerging from the catcher element 14 is much lower than from a flat surface. When ions or particles strike a surface reemission of the material at the point of impact will occur. When the incoming particles arrive at an oblique angle of incidence, the reemission will occur in the forward direction. For example, if the incoming ions strike a surface at an angle of 60° the majority of the emitted atoms or material will leave the surface at an angle of approximately 60° to the normal but in the opposite direction. Even for ions that strike the surface normally the emitted atoms leave with a cosine distribution rather than solely in a direction normal to the surface. Thus, in the embodiment shown in FIG. 1, and also FIGS. 4 and 5, particles or atoms arriving from the electrode 12 will strike surface 42 of fin 40 at an inclined angle. The material dislodged by the particle or ion will leave surface 42 at approximately the same angle and thus be directed to the back side of the adjoining fin 40 to strike surface 44. The material will either stick or be reemitted back on to the surface 42 of the adjacent fin 40. At any rate, the material will proceed upwardly into the fin arrangement. Further, when material sticks to surface 44 on the back side of fin 40, it will be subjected to very little direct bombardment of material emanating from the region surrounding electrode 12. Material that has worked its way up into the fins may ultimately land and be deposited on surface 45 which due to the position of the fins does not undergo a great deal of bombardment since only particles traveling at the same angle of the fins from the electrode 12 will strike the surface.

In the previously discussed phenomena the sputtered material removed from the electrode 12 and substrates S and the associated surfaces will in general be neutral, with only a very small fraction being charged. The principle utilized in the catcher element of the invention does not depend on any electrostatic principles but purely on mechanical geometric principles. It is understood that the electrical potential of the catcher 14 is not of any great relevance since additional sputtering, because of a negative potential relative to the glow discharge, will still cause trapping of material by the mechanism described. However, in practice one would not wish to cause excessive resputtering since it would increase the probability of some material escaping. Preferably the catcher should be kept at the lowest possible potential relative to the plasma. This can be accomplished by electrically connecting it to ground or to the base plate 16 as shown in FIG. 1. Catcher 14 can be supported any suitable distance from the surface of work support electrode 12. In practice, it has been found that the spacing between fins can be approximately one-third the height of the fins. It is to be understood that the fins need not be circular in shape. The fins can have a square, rectangular configuration or alternatively can be a series of parallel straight fins if desired.

Figure 2:
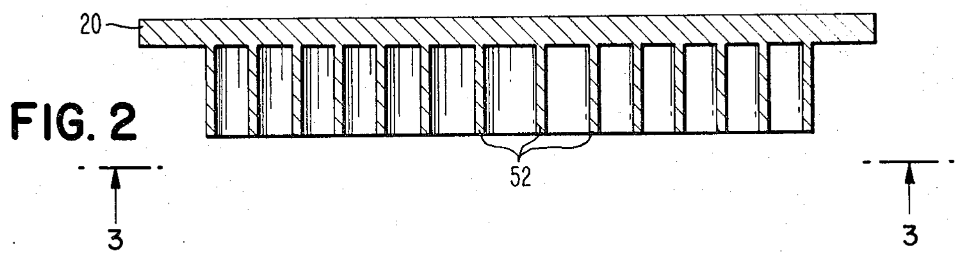
FIG. 2 is an elevational view in broken cross section illustrating a preferred specific embodiment of the catcher element of the invention.
Figure 3:
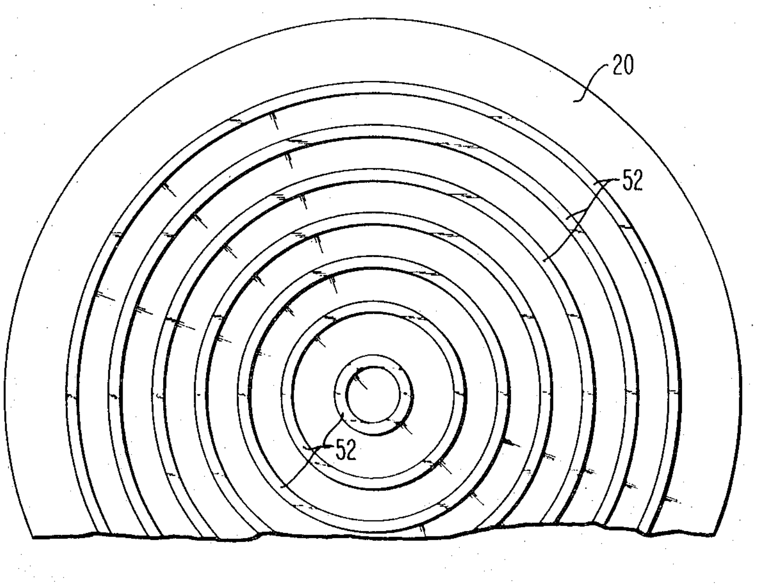
FIG. 3 is a view taken on section 3—3 of FIG. 2.

Referring now to FIGS. 2 and 3 there is shown a second preferred specific embodiment of the catcher element of the invention. The catcher element consists of a plurality of concentric tubular or cylindrical fin elements 52 supported on plate 20. The fins 52 are such length that they provide adequate surface area within which particles emanating from the region of the electrode 12 will be caused to sequentially bounce and ultimately stick to the surface. That is, the arrangement of fins effectively traps any material dislodged from the fin by bombardment of ions or neutrals. The basic principle of the entrapment of material operates in basically the same manner as discussed in relation to the catcher embodiment shown in FIGS. 4 and 5. However, the configuration shown in FIGS. 2 and 3 can be fabricated more easily. As in the case of the previous catcher embodiment, the fins can be of any configuration as for example rectangular, square or may consist of a mere plurality of parallel fins.

Various other geometric designs of fins are possible. The configurations here illustrated have been found through experience to offer the most satisfactory results consistent with minimum manufacturing costs because they are arranged in such a way that they are sufficient to catch any reemitted particles and thus act as a baffle system for preventing redeposition of material to the surface being treated.

The following example is presented to illustrate the effectiveness of the apparatus and method of the invention and should not be taken to unduly limit the scope of the invention.

EXAMPLE

Four 8-ohm-centimeter silicon wafers were numbered 1 through 4 and oxidized in a dry furnace in an environment of pure oxygen at one atmosphere pressure, heated to 1000° C. A coating of thermal $SiO_2$ having a thickness of 1000 A. was formed. Sample Number 1 was used as a control sample for the sake of comparison. Samples 2, 3, and 4 received 250 A. of phosphosilicate glass (PSG) which was deposited by exposing the wafers to a $POCl_3$ gas heated to 850° C. The resultant phosphosilicate glass was then removed by sputter etching from wafer 2 with a conventional sputter etching apparatus which was not provided with a catcher of the type described in this application. The phosphosilicate glass on wafers 3 and 4 was removed with a sputter etching apparatus provided with a catcher element having a support plate and a plurality of concentric baffles. The sputter etching was accomplished at 100 watts for a time sufficient to remove the phosphosilicate glass layer. Immediately following the etching of glass layer, silicon nitride was deposited by reactive sputtering using a conventional RF sputtering apparatus having a silicon target, a nitrogen gas in the chamber at a pressure of 3 microns, and a power density of 4.2 watts per square centimeter. Aluminum dots were then evaporated on the surface of the resultant silicon nitride layer with an electron gun. The resulting structure is known as a metal-insulator-semiconductor (MIS) capacitor, whose properties are well known. The capacitance of such a MIS structure is a function of DC voltage applied across the structure. By measuring the capacitance C as a function of DC voltage V, it is possible to determine the flatband voltage $V_{FB}$, which is a characteristic of the surface properties of the semiconductor and is very important in determining the properties of semiconductor electronic devices. The properties of the system are related by the simple equation:

$q N_{FB}=C V_{FB}$ where $N_{FB}$ is called the flat-band charge, and $q$ is the unit of electronic charge. Similarly, the stability of the semiconductor surface after thermal/electrical stress is measured by the change in $N_{FB}$. It is desired to have $\Delta N_{FB}$ small for semiconductor electronic devices. The relationship of $\Delta N_{FB}$ to other parameters is: $q\Delta N_{FB}=C\Delta V_{FB}$ Measurements of the flat-band voltage $V_{FB}$ were made after electroding, after annealing, and after temperature bias. The flat-band charge $N_{FB}$ was determined initially and subsequent to the etching operations. The results are tabulated in the following table:

| Sample | Initial $N x 10^{11}/cm.^2$ FB | Change after stress $\Delta N x 10^{11}$ cm.$^2$ FB | Comments |
|---|---|---|---|
| 1. $SiO_2 + Si_3N_4$ | 1.43 | 2.57 | No PSG, No catcher. |
| 2. $SiO_2$ (+PSG) + $Si_3N_4$. | 2.0 | 1.9 | No catcher. |
| 3. $SiO_2$ (+PSG) + $Si_3N_4$. | 0.78 | 0.83 | Catcher. |
| 4. $SiO_2$ (+PSG) + $Si_3N_4$. | 0.80 | 0.91 | Do. |

$\Delta N_{FB}$ is a measure of the instability of the semiconductor surface. The instability of the semiconductor surface in this series of runs is directly related to the amount of contamination reintroduced during the sputter etching of the phosphosilicate glass layers in runs 2, 3, and 4. Wafter 1 was a control sample. Wafter 2 shows the effect of gettering Na+ with PSG, which was removed by sputter etching without a catcher element. The improvement, i.e., lowering of $\Delta N_{FB}$ is evident. Wafers 3 and 4 show the improvement after sputter etching the PSG with the catcher in place. Note the lower flat-band charge $\Delta N_{FB}$, in wafers 3 and 4 as compared to 2. The difference in $\Delta N_{FB}$ between 1 and 2 is due to the gettering effect of the phosphosilicate glass layer provided in 2.

The above table shows very clearly the effect of including a catcher element in the sputter etching apparatus. The reduction in $\Delta N_{FB}$ in wafer 3 and 4 as compared to 2 is due to a reduction in contaminants occuring when the PSG layer was removed by sputter etching. The catcher element prevented the recontamination.

While the invention has been particularly shown and described, particularly with reference to preferred embodiments thereof, it will be understood by those skilled in the art to which it is directed that various changes in form and detail may be made therein without departing from the spirit and scope of the invention.

We claim:

1. Apparatus for sputter etching an object comprising, a sputtering chamber adapted to contain a reduced pressure gaseous atmosphere therein, a pair of conductive electrodes within the said sputter chamber, means for applying a radiofrequency voltage between the electrodes, at least one of said electrodes provided with a generally flat surface to support an object to be etched, the applied radiofrequency voltage being sufficiently high to produce a glow discharge in the chamber to induce sputter etching of an exposed surface of an object by bombardment of ions of the inert gaseous atmosphere, and a material catcher means positioned in spaced relation to the unsupported object surface and the said electrode supporting said object to receive and hold material removed during etching and minimize contamination of the object being sputter etched, said catcher means having a flat support plate positioned in a plane generally parallel to said electrode for supporting an object, and a plurality of spaced fin members depending therefrom and positioned between said flat support plate and said electrode for supporting an object.

2. The apparatus of claim 1 wherein said plurality of spaced fin members is comprised of a plurality of concentrically disposed cylindrical shaped fins.

3. The apparatus of claim 1 wherein said plurality of spaced fin members is comprised of a plurality of concentrically disposed frustoconically shaped fins.

4. The apparatus of claim 1 wherein said spaced fin members is electrically connected to said radiofrequency voltage and serves, at least in part, as the second electrode.

5 The sputter etching apparatus of claim 1 wherein said catcher means is the anode.

6. In a sputter etching apparatus including a vacuumtight chamber, a pair of electrodes in the chamber, one of which has a generally flat surface for supporting an object to be sputter etched, means for applying a voltage between the electrodes, the improvement comprising, a material catcher means positioned in spaced relation to the supported object surface and said electrode supporting said object to receive and hold material removed during etching to minimize reemission of material and to minimize contamination of the object being sputter etched, said catcher means having a flat support portion positioned in a plane generally parallel to said electrode for supporting an object, and a plurality of spaced fin members depending therefom positioned between said flat support portion and said electrode for supporting an object.

7. The sputter etching apparatus of claim 6 wherein said means for applying a voltage is a source of DC voltage.

* * * * *